(12) United States Patent
Kuechler et al.

(10) Patent No.: US 6,245,703 B1
(45) Date of Patent: Jun. 12, 2001

(54) EFFICIENT METHOD USING LIQUID WATER TO REGENERATE OXYGENATE TO OLEFIN CATALYSTS WHILE INCREASING CATALYST SPECIFICITY TO LIGHT OLEFINS

(75) Inventors: Keith H. Kuechler, Friendswood; Stephen N. Vaughn, Kingwood, both of TX (US)

(73) Assignee: Exxon Mobil Chemical Patents Inc.

( * ) Notice: Subject to any disclaimer, the term of this patent is extended or adjusted under 35 U.S.C. 154(b) by 0 days.

(21) Appl. No.: 09/069,507

(22) Filed: Apr. 29, 1998

(51) Int. Cl.⁷ .................... B01J 20/34; B01J 38/48; B01J 38/12; B01J 38/16; C07C 1/00
(52) U.S. Cl. ................ 502/22; 502/38; 502/51; 502/55; 585/638; 585/639; 585/640
(58) Field of Search ................ 502/22, 38, 51, 502/55; 585/638–640

(56) References Cited

U.S. PATENT DOCUMENTS

| | | | |
|---|---|---|---|
| 3,898,173 | 8/1975 | Hayes | 252/415 |
| 3,909,392 | 9/1975 | Horecky, Jr. et al. | 208/120 |
| 4,026,789 | * 5/1977 | James | 208/74 |
| 4,417,975 | 11/1983 | Myers et al. | 208/120 |
| 4,440,871 | 4/1984 | Lok et al. | 502/214 |
| 4,499,327 | 2/1985 | Kaiser | 585/640 |
| 4,584,090 | 4/1986 | Farnsworth | 208/80 |
| 4,600,700 | 7/1986 | McHale | 502/50 |
| 4,764,268 | 8/1988 | Lane | 208/113 |
| 4,780,195 | 10/1988 | Miller | 208/120 |
| 4,786,400 | 11/1988 | Farnsworth | 208/80 |
| 4,861,938 | 8/1989 | Lewis et al. | 585/640 |
| 5,095,163 | 3/1992 | Barger | 585/640 |
| 5,126,308 | 6/1992 | Barger et al. | 502/214 |
| 5,191,141 | 3/1993 | Barger et al. | 585/640 |
| 5,248,647 | 9/1993 | Barger | 502/214 |
| 5,714,662 | * 2/1998 | Vora et al. | 585/640 |
| 5,744,680 | 4/1998 | Mulvaney, III et al. | 585/640 |
| 5,883,031 | * 3/1999 | Innes et al. | 502/38 |
| 6,023,005 | * 2/2000 | Lattner et al. | 585/639 |

FOREIGN PATENT DOCUMENTS

| | | |
|---|---|---|
| 0 062 779 | 10/1982 | (EP) . |
| 0 134 924 | 3/1985 | (EP) . |
| 0 359 841 | 3/1990 | (EP) . |

OTHER PUBLICATIONS

Chang, "Methanol Conversion to Light Olefins," *Catal. Rev.–Sci. Eng.*, 26(3&4), pp. 323–345 (1984) Month N.A.
Kaeding, et al., "Production of Chemicals from Methanol," *Jounal of Catalysts*, vol. 64, pp. 155–164 (1980) Jun. 1979.
*Zeolites*, vol. 17, pp. 212–222 (1996) Month N.A.

* cited by examiner

Primary Examiner—Mark L. Bell
Assistant Examiner—Patricia L. Hailey
(74) Attorney, Agent, or Firm—Bradley Keller

(57) ABSTRACT

The present invention provides a method for maintaining temperature during regeneration of an oxygenate to olefins catalyst using liquid water as a coolant in an amount sufficient either to reduce duty of a catalyst cooler or to avoid the need to use a catalyst cooler altogether. The method also may be used to hydrotreat fresh, non-hydrothermally treated catalyst which may be added to the regenerator and charged back to the conversion reactor along with the regenerated catalyst.

4 Claims, 1 Drawing Sheet

EFFICIENT METHOD USING LIQUID WATER TO REGENERATE OXYGENATE TO OLEFIN CATALYSTS WHILE INCREASING CATALYST SPECIFICITY TO LIGHT OLEFINS

FIELD OF THE INVENTION

The present invention relates to a method in which water and air are used to regenerate oxygenate to olefin catalysts. The regeneration process results in hydrothermal treatment of small pore molecular sieve catalysts in situ to improve selectivity of the catalysts to desired light olefins. The method also may eliminate the need for a separate catalyst cooler.

BACKGROUND OF THE INVENTION

Light olefins, defined herein as ethylene, propylene, and butylene, serve as feeds for the production of numerous chemicals. Olefins traditionally are produced by petroleum cracking. Because of the limited supply and/or the high cost of petroleum sources, the cost of producing olefins from petroleum sources has increased steadily.

Alternative feedstocks for the production of light olefins are oxygenates, such as alcohols, particularly methanol, dimethyl ether, and ethanol. Alcohols may be produced by fermentation, or from synthesis gas derived from natural gas, petroleum liquids, carbonaceous materials, including coal, recycled plastics, municipal wastes, or any organic material. Because of the wide variety of sources, alcohol, alcohol derivatives, and other oxygenates have promise as an economical, non-petroleum source for olefin production.

The catalysts used to promote the conversion of oxygenates to olefins are molecular sieve catalysts. Because ethylene and propylene are the most sought after products of such a reaction, research has focused on what catalysts are most selective to ethylene and/or propylene, and on methods for increasing the life and selectivity of the catalysts to ethylene and/or propylene.

The conversion of oxygenates to olefins generates and deposits carbonaceous material (coke) on the molecular sieve catalysts used to catalyze the conversion process. Over accumulation of these carbonaceous deposits will interfere with the catalyst's ability to promote the reaction. In order to avoid unwanted build-up of coke on the molecular sieve catalyst, the oxygenate to olefin process incorporates a second step comprising catalyst regeneration. During regeneration, the coke is removed from the catalyst by combustion with oxygen, which restores the catalytic activity of the catalyst. The regenerated catalyst then may be reused to catalyze the conversion of oxygenates to olefins.

Typically, oxygenate to olefin conversion and regeneration are conducted in two separate vessels. The coked catalyst is continuously withdrawn from the reaction vessel used for conversion to a regeneration vessel and regenerated catalyst is continuously withdrawn from the regeneration vessel and returned to the reaction vessel for conversion. Steam has been used to absorb the exothermic heat of reaction in the regenerator; however, the steam typically must be generated using a catalyst cooler/heat exchanger. The catalyst cooler is an expensive item of equipment which is limited in size. Because of size limitations, it often is necessary to use more than one catalyst cooler to remove the amount of heat generated by a given regenerator. The use of more than one catalyst cooler is undesirable because every piece of equipment through which the catalyst must travel increases catalyst attrition and catalyst make-up cost.

More economical methods are needed to absorb the heat from the combustion of coke during the regeneration of oxygenate to olefin catalysts.

SUMMARY OF THE INVENTION

The present invention provides a method for regenerating an oxygenate to olefin catalyst comprising: contacting a feed comprising oxygenates with a total reaction volume of a molecular sieve catalyst in a reaction zone under conditions effective to produce a stream comprising $C_2$–$C_3$ olefins and to form an initial amount of carbonaceous deposits on the catalyst; transferring a portion of the catalyst to a regeneration zone, leaving a remainder of the catalyst in the reaction zone; treating the portion of catalyst in the regeneration zone by injecting a stream comprising oxygen and a quantity of liquid water under regenerator conditions effective to regenerate the portion of catalyst, forming a regenerated portion, wherein the quantity of liquid water is sufficient to maintain a temperature effective to regenerate the catalyst without destroying structural integrity of the catalyst.

BRIEF DESCRIPTION OF THE DRAWING

The FIGURE depicts a conventional oxygenates to olefins conversion process modified using the regeneration method of the present invention.

DETAILED DESCRIPTION OF THE INVENTION

Figure 1:
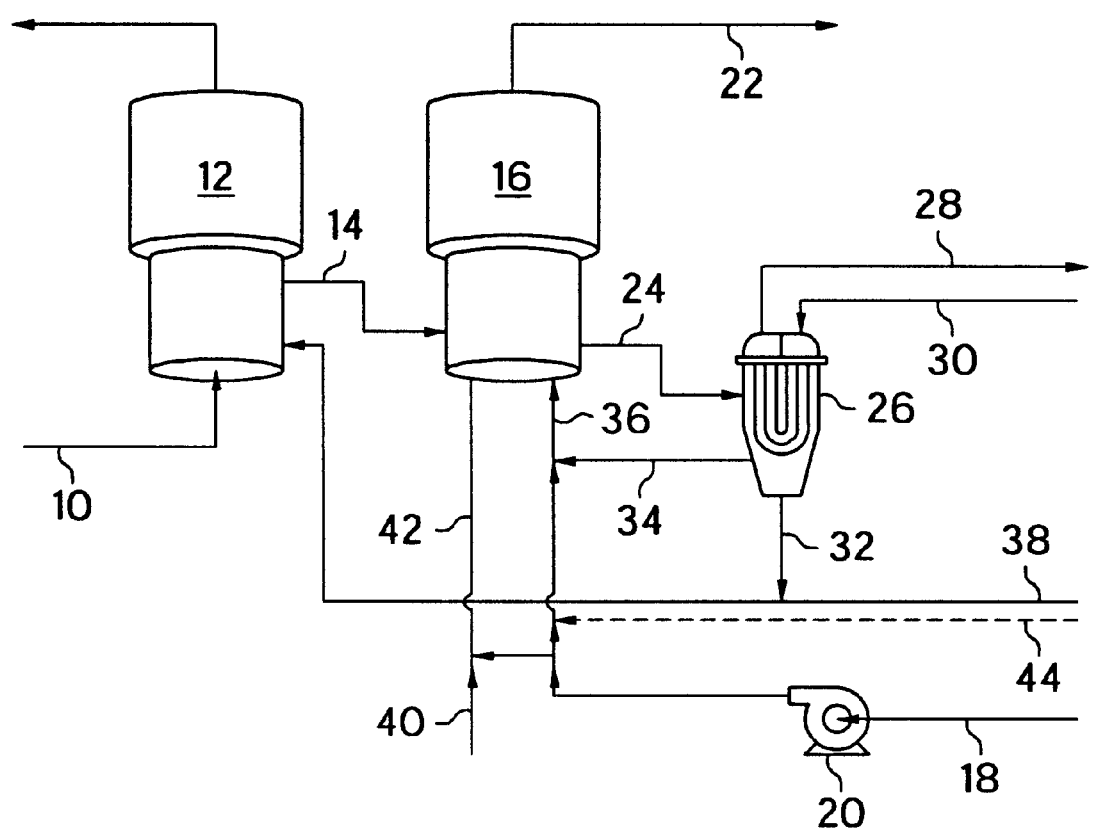

According to the present invention, liquid water is added to a vessel for regenerating a catalyst for the conversion of oxygenates to olefins. The water absorbs the exothermic heat from the combustion of coke and is converted to steam in situ. The steam is carried away from the regenerator as a component of the vapor effluent/combustion products. Although the method may be used in conjunction with an external catalyst cooler, a preferred embodiment involves the injection of a sufficient amount of liquid water into the regenerator to moderate the temperature rise without the need for a separate catalyst cooler. The effect of water injection into the regenerator is to increase the partial pressure of water in the vapor to which the catalyst is exposed in the regenerator. By controlling the design of the overall conversion process, the catalyst can be exposed during regeneration to conditions effective to also hydrothermally treat the catalyst, thereby decreasing catalyst acidity, increasing catalyst life, and increasing catalyst selectivity to ethylene and propylene.

Most catalysts that are used in oxygenate conversion and petroleum cracking processes are molecular-sieve containing catalysts. Molecular sieves generally comprise a stable crystalline framework structure enclosing cavities of molecular dimensions. The cavities form a well-defined microporous system of cages and two- and/or three-dimensional channels. The channels may or may not be connected with one another. The cavities or pores in a given type of molecular sieve have well-defined dimensions which will only allow molecules up to a certain size to enter the pores. The pores can be as small as about 3 Angstroms and as large as about 15 Angstroms or larger. Most catalytic reactions are believed to take place inside of these pores.

Substantially any molecular sieve catalyst may be regenerated according to the present invention, regardless of the structure type or pore size. Preferred molecular sieve catalysts comprise "small" and "medium" pore molecular sieve catalysts. A "small pore" molecular sieve catalysts are defined as catalysts with pores having a diameter of less than about 5.0 Angstroms. A "medium pore" molecular sieve catalysts are defined as catalysts with pores having a diameter in the range of from about 5.0 to about 13.0 Angstroms.

A molecular sieve catalyst can be zeolitic (zeolite) or non-zeolitic. Zeolitic molecular sieve catalysts suitable for the use in the present invention with varying degrees of effectiveness include, but are not necessarily limited to AEI, AFI, CHA, ERI, FAU, LOV, MON, RHO, THO, MFI, FER, AEL, MEL, and substituted examples of these structural types, as described in W. M. Meier and D. H. Olson, *Atlas of zeolitic Structural Types* (Butterworth Heineman—3rd ed. 1997), incorporated herein by reference.

Preferred zeolite catalysts include but are not necessarily limited to zeolite A, zeolite X, zeolite Y, zeolite USY, ZSM-5, ZSM-11, ZSM-22, ZSM-34, MCM-41, erionite, chabazite, mordenite, zeolite L, zeolite beta, borosilicates and mixtures thereof.

Zeolites possess acidity as a result of the difference in valences between the two major framework elements—silicon (valence of 4+) and aluminum (valence of 3+). It is believed that zeolites can have both Lewis acid sites which accept electron donating moieties, and Bronsted acid sites which donate protons ($H^+$ ions). Most catalytic reactions take place at or near various acidic sites.

Zeolites may be used in the present invention as synthesized or the zeolites may be modified with a variety of modifiers or treatments. These modifiers may change the acidity, the nature of acid sites, pore size, pore size distribution, crystallinity, surface area, and other properties of the zeolites. Metal ions such as alkali metal ions, alkaline earth metal ions, transition metal ions, particularly Pd and Pt ions, and ions of B, Ge, Sn, Ti, Zr, and others, can be incorporated into either the zeolite framework and/or outside the framework. Calcination, hydrothermal treatment, treatment with oxidizing and/or reducing agents, and treatment with acids such as HF, HCl, and chelating agents, also can be carried out to alter the physical and chemical properties of zeolites.

Non-zeolitic molecular sieves also are suitable for use in the present invention. Silicoaluminophosphates (SAPO's), metal aluminophosphates (MeAPO's), and metal aluminophosphosilicon oxides (MeAPSO's) have been synthesized and investigated as catalysts for converting oxygenate feeds or cracking heavy hydrocarbons to light olefins. Aluminophosphate molecular sieves (ALPO's) also may be used in the present invention. These non-zeolitic molecular sieves collectively are referred to herein as "SAPO type" molecular sieves.

SAPO type molecular sieves have a three-dimensional microporous crystalline framework Of $PO_2^+$, $AlO_2^+$, $SiO_2$ and $MeO_2^m$ tetrahedral units, with or without metals in the framework. The "m" superscript represents a net electric charge depending on the valence state of the metal, Me. When Me has a valence state of +2, +3, +4, +5, or +6 valence state, m is −2, −1, 0, +1, and +2, respectively. "Me" includes, but is not necessarily limited to Zn, Mg, Mn, Co, Ni, Ga, Fe, Ti, Zr, Ge, Sn, Cr, and mixtures thereof.

Because an aluminophosphate ($AlPO_4$) framework inherently is neutral in electric charge, the incorporation of silicon or other metallic or nonmetallic elements into the framework by substitution generates more active catalytic sites, particularly acid sites and increased acidity. Controlling the quantity and location of silicon atoms and other elements incorporated into an $AlPO_4$ framework is important in determining the catalytic properties of a particular SAPO type molecular sieve. Properly adjusted acid strength, acidity distribution, and acid site density are the keys to forming a good oxygenate conversion or petroleum cracking catalyst.

The catalytic properties can be modified after the SAPO type molecular sieve catalyst has been synthesized. "Post-synthesis" modification is accomplished by treating the molecular sieve with metallic, semi-metallic or non-metallic materials comprising nickel, cobalt, manganese, beryllium, magnesium, calcium, strontium, barium, lanthanides, actinides, fluorine, chlorine, chelating agents, and others. The modifiers may or may not become part of the final composition of the modified catalyst.

Suitable SAPO type molecular sieves are those capable of converting an oxygenate feed to olefins and include, but are not necessarily limited to, SAPO-5, SAPO-11, SAPO-17, SAPO-18, SAPO-34, SAPO-44, SAPO-56, CoAPSO-34, NiAPSO-34, CoAPSO-17, NiAPSO-17, MnAPSO-17, CrAPSO's, MgAPSO's, CoAPO's, NiAPO's, MnAPO's, and mixtures thereof. Many of the foregoing SAPO type molecular sieves are available commercially from UOP of Des Plaines, Ill. MeAPO's and MeAPSO's also may be synthesized as described in U.S. Pat. No. 5,126,308. SAPO-17, SAPO-34, and SAPO-44 may be synthesized according to U.S. Pat. No. 4,440,871, incorporated herein by reference, and Zeolites, Vol. 17, pp 512–522 (1996), incorporated herein by reference.

SAPO type molecular sieves with small pores—pores smaller than about 5 Angstroms—are preferred because they tend to favor light olefin production as a result of sieving effects. A preferred small pore SAPO type molecular sieve is SAPO-34 which has a pore diameter of about 4.3 Angstroms. Other preferred small pore SAPO type molecular sieves include, but are not necessarily limited to SAPO-17, SAPO-18, SAPO-44, CoAPSO-17, NiAPSO-17, MnAPSO-17, CoAPSO-34, NiAPSO-34, CrAPSO-34, and mixtures thereof.

For the chabazite-like or erionite-like SAPO-17, SAPO-18, SAPO-34 and SAPO-44 molecular sieves, it may be possible to incorporate more silicon atoms into the tetrahedral positions of the framework to afford greater flexibility in adjusting acidic properties. Medium pore molecular sieves such as SAPO-11 and large pore molecular sieves such as SAPO-5 may be used to convert oxygenates to olefins, but they tend to produce less light olefins and more heavier hydrocarbons, including aromatics.

The process for converting oxygenates to olefins employs an organic starting material (feedstock) preferably comprising "oxygenates." As used herein, the term "oxygenates" is defined to include, but is not necessarily limited to aliphatic alcohols, ethers, carbonyl compounds (aldehydes, ketones, carboxylic acids, carbonates, and the like), and also compounds containing hetero-atoms, such as, halides, mercaptans, sulfides, amines, and mixtures thereof. The aliphatic moiety preferably should contain in the range of from about 1–10 carbon atoms and more preferably in the range of from about 1–4 carbon atoms. Representative oxygenates include, but are not necessarily limited to, lower straight chain or branched aliphatic alcohols, their unsaturated counterparts, and their nitrogen, halogen and sulfur analogues. Examples of suitable compounds include, but are not necessarily limited to: methanol; ethanol; n-propanol; isopropanol; $C_4-C_{10}$ alcohols; methyl ethyl ether; dimethyl ether; diethyl ether; di-isopropyl ether; methyl mercaptan; methyl sulfide; methyl amine; ethyl mercaptan; di-ethyl sulfide; di-ethyl amine; ethyl chloride; formaldehyde; di-methyl carbonate; di-methyl ketone; n-alkyl amines, n-alkyl halides, n-alkyl sulfides having n-alkyl groups of comprising the range of from about 3 to about 10 carbon atoms; and mixtures thereof. As used herein, the term "oxygenate" designates only the organic material used as the feed. The total charge of feed to the reaction zone may contain additional compounds such as diluents.

Conventional processes and processes modified using the regeneration method of the present invention will be described with reference to the FIGURE. An oxygenate feed 10 is introduced to a conversion reactor 12 which is filled in part with catalyst. The oxygenate feed 10 is contacted in the vapor phase in a the conversion reactor 12 with the defined molecular sieve catalyst at effective process conditions so as to produce the desired olefins, i.e., an effective temperature, pressure, WHSV (Weight Hourly Space Velocity) and, optionally, an effective amount of diluent, correlated to produce olefins. Alternately, the process may be carried out in a liquid or a mixed vapor/liquid phase. When the process is carried out in the liquid phase or a mixed vapor/liquid phase, different conversions and selectivities of feedstock-to-product may result depending upon the catalyst and reaction conditions.

The temperature employed in the conversion process may vary over a wide range depending, at least in part, on the selected catalyst. Although not limited to a particular temperature, best results will be obtained if the process is conducted at temperatures in the range of from about 200° C. to about 700° C., preferably in the range of from about 250° C. to about 600° C., and most preferably in the range of from about 300° C. to about 500° C. Lower temperatures generally result in lower rates of reaction, and the formation of the desired light olefin products may become markedly slow. However, at higher temperatures, the process may not form an optimum amount of light olefin products, and the coking rate may become too high.

Light olefin products will form—although not necessarily in optimum amounts—at a wide range of pressures, including but not limited to autogeneous pressures and pressures in the range of from about 0.1 kPa to about 100 MPa,. A preferred pressure is in the range of from about 6.9 kPa to about 34 MPa, most preferably in the range of from about 48 kPa to about 0.34 MPa. The foregoing pressures are exclusive of diluent, if any is present, and refer to the partial pressure of the feedstock as it relates to oxygenate compounds and/or mixtures thereof. Pressures outside of the stated ranges may be used and are not excluded from the scope of the invention. Lower and upper extremes of pressure may adversely affect selectivity, conversion, coking rate, and/or reaction rate; however, light olefins such as ethylene still may form.

The process should be continued for a period of time sufficient to produce the desired olefin products. The reaction cycle time may vary from tenths of seconds to a number of hours. The reaction cycle time is largely determined by the reaction temperature, the pressure, the catalyst selected, the weight hourly space velocity, the phase (liquid or vapor), and the selected process design characteristics.

A wide range of weight hourly space velocities (WHSV)—defined as weight feed per hour per weight of catalyst contained in the reaction zone—for the feedstock will function in the present invention. The WHSV generally should be in the range of from about 0.01 hr to about 5000 $hr^{-1}$, preferably in the range of from about 0.1 $hr^{-1}$ to about 2000 $hr^{-1}$, and most preferably in the range of from about 1 $hr^{-1}$ to about 1000 $hr^{-1}$. The catalyst may contain other materials which act as inerts, fillers, or binders; therefore, the WHSV is calculated on the weight basis of oxygenate and catalyst.

One or more diluents may be fed to the reaction zone with the oxygenates, such that the total feed mixture comprises diluent in a range of from about 1 mol % and about 99 mol %. Diluents which may be employed in the process include, but are not necessarily limited to, helium, argon, nitrogen, carbon monoxide, carbon dioxide, hydrogen, water, paraffins, other hydrocarbons (such as methane), aromatic compounds, and mixtures thereof. Preferred diluents are water and nitrogen.

A preferred embodiment of a reactor system for the present invention is a circulating fluid bed reactor with continuous regeneration, similar to a modern fluid catalytic cracker. Fixed beds are not practical for the process because oxygenate to olefin conversion is a highly exothermic process which requires several stages with intercoolers or other cooling devices. The reaction also results in a high pressure drop due to the production of low pressure, low density gas.

Referring to the FIGURE, coke formed as a byproduct of the conversion reaction in the conversion vessel 12 is deposited on the catalyst. The coked catalyst is continuously withdrawn as a stream 14. The stream 14 is sent to a regenerator 16 where air from a stream 18 is introduced via an air compressor 20. The oxygen in the air effects complete combustion of the coke, and generates a gaseous reaction product flue gas as an overhead stream 22. A regenerated portion of substantially coke free catalyst—preferably comprising about 0.5 wt % or less of said carbonaceous deposits—is continuously withdrawn as a stream 24.

One goal during the conversion of oxygenates to olefins is to maximize the production of light olefins, preferably ethylene and propylene, and to minimize the product of methane, ethane, propane, and $C_5$+ materials. In a preferred embodiment of the present invention, the coke that unavoidably deposits on the catalyst can be used to achieve this goal by allowing "desirable carbonaceous deposits" to accumulate on the molecular sieve catalyst while removing undesirable carbonaceous deposits. As used herein, the term "desirable carbonaceous deposits" is defined to comprise an amount of at least about 2 wt % carbonaceous deposits, preferably in the range of from about 2 wt % to about 30 wt % carbonaceous deposits, based on the weight of the total reaction volume of coked catalyst. "Desirable carbonaceous deposits"—even if they comprise over 30 wt % of the total reaction volume of molecular sieve catalyst—are carbonaceous deposits which primarily block portions of the surface of the catalyst that are not selective to the production of $C_2$–$C_3$ olefins.

The combustion of carbonaceous deposits in the conversion reactor 16 is extremely exothermic and, in the absence of steps to remove some of the heat released, will cause a temperature rise in the vessel that will destroy the structural integrity of both the vessel and the catalyst. To avoid such overheating, a stream 24 is sent to a catalyst cooler 26, which reduces the temperature of the catalyst by heat exchange with water and the production of steam (streams 28 and 30, respectively). A portion of the cooled catalyst is returned to the regenerator 16 as stream 34 which is hydraulicly moved into the regenerator 16 by mixing with a portion of the air 18 from the air compressor 20 as stream 36. The cooled catalyst stream 36 provides a heat sink for the combustion reaction and controls the temperature in the regenerator 16.

The balance of the catalyst from the catalyst cooler 26 is returned to the conversion reactor 12 via the stream 32, which is pneumatically moved into the conversion reactor 12 by mixing with steam stream 38, thereby maintaining overall system catalyst balance and providing regenerated catalyst to the conversion reactor 12 to continue the conversion. The temperature in the regenerator 15 in conventional processes is completely set by the amount of heat removal in the catalyst cooler 26, and the partial pressure of water to which the catalyst is exposed is only a function of the composition of the coke in stream 14 which sets the stoichiometry of the combustion reaction.

The present invention reduces the need for a catalyst cooler by injecting a stream 40 of moderating water to the conversion reactor 12. The water preferably is mixed with a portion of the air 18 from the compressor 20, forming a combined stream 42 of air and water. A sufficient amount of water should be introduced to achieve a desired amount of cooling to either reduce the burden on a catalyst cooler, or preferably to avoid the need for a catalyst cooler. Given the parameters in the following examples, persons of ordinary skill in the art will be able to determine an appropriate flow of water to achieve a desired goal.

Two embodiments of the invention are particularly useful when replacement charges of fresh, non-hydrothermally treated catalyst are being added to the regenerator via optional stream 44. One embodiment uses parameters similar to those described in U.S. Pat. No. 5,248,647, incorporated herein by reference. In this embodiment, the temperature in the regenerator 16 is held above 700° C. (1 292° F.) while introducing a fresh, non-hydrothermally treated catalyst stream 44 to the regenerator 16. A sufficient flow of moderating water stream 40 is added to the regenerator 16 to result in partial pressures of steam of above about 13.79 kPa (2 psia). The temperature and partial pressure of steam are maintained at these levels for a period of time sufficient to achieve hydrothermal treatment of the catalyst, typically for a time in the range of from about 0.01 to about 100 hours. The flow of the moderating water stream 40 is then reduced or cut off entirely until hydrothermal treatment is again needed.

In a second, preferred embodiment, hydrothermal treatment of the fresh catalyst stream 44 is achieved by maintaining the temperature in the regenerator 16 below 700° C. (1292° F.). A moderating water stream 40 is added to obtain a partial pressure of steam of at least about 4 psia. The temperature and partial pressure of steam are maintained for a period of time sufficient to achieve hydrothermal treatment, typically in the range of from about 0.0 to about 100 hours.

The invention will be better understood from the following examples, which are illustrative only and are not intended to limit the scope of the present invention. In the examples, the following parameters were used, unless otherwise indicated:

Catalyst heat capacity=1.13 j/g-° C. (0.27 Btu/b-° F.), "coke" heat capacity=0.71 j/g-° C. (0.17 Btu/lb-° F.);

Composition of "coke" in all streams, atomic ratio hydrogen/carbon=0.6 i.e., $CH_{0.6}$ (no other elements);

Complete combustion of "coke" in regenerator 5 to $CO_2$ and $H_2O$, with extent of combustion sufficient to provide a proportion of "coke" of 0.1 wt % (within regenerator 16 and in stream 24);

Compressed air in stream 18=21 mol % $O_2$, 79 mol % $N_2$, 170° C. (338° F.), 275.8 kPa (40 psia) at a rate sufficient to supply 102% of $O_2$ needed for complete combustion (humidity is ignored, i.e., no water in stream 11);

Pressure in regenerator 16=241.3 kPa (35 psia) at top, 275.8 kPa (40 psia) at bottom Change in temperature of catalyst fed to catalyst cooler 26, i.e., temperature of stream 24 minus the temperature of stream 34 or 32, is 225° C. (405° F.) (stream 34 and 32 are at identical temperatures), except Example 3 as described Stream 14 is at 431° C. (807° F.) and 275.8 kPa (40 psia)

Moderating water stream 40 is 100% $H_2O$, 126° C. (259° F.), 274.8 kPa (40 psia)

The key parameters of the rate and composition of stream 14, temperature of regenerator 16, and rate of moderating water stream 40 were varied, and the resultant impact to the required duty of catalyst cooler 26, rate of stream 34 and partial pressure of steam in regenerator 16 was determined, as set forth in Table 1.

EXAMPLE I

Referring to the FIGURE, coked catalyst from a conversion reaction having the foregoing parameters was continuously withdrawn as stream 14. The stream 14 was sent to a regenerator 16 where air from the stream 18 was introduced via an air compressor 20. The oxygen in the air effected complete combustion of the coke, and provided a gaseous product as an overhead stream 22. A substantially coke free catalyst was continuously withdrawn as a stream 24.

To avoid overheating, a stream 24 was sent to a catalyst cooler 26, which reduced the temperature of the catalyst by heat exchange with water and the production of steam (streams 28 and 30, respectively). A portion of the cooled catalyst was returned to the regenerator 16 as stream 34 which was pneumatically moved into the regenerator 16 by mixing with a portion of the air 18 from the air compressor 20 as stream 36. The cooled catalyst stream 36 provided a heat sink for the combustion reaction and controlled the temperature in the regenerator 16.

The balance of the catalyst from the catalyst cooler 26 was returned to the conversion reactor 12 via the stream 32, which was pneumatically moved into the conversion reactor 12 by mixing with steam stream 38, thereby maintaining overall system catalyst balance and providing regenerated catalyst to the conversion reactor 12 to continue the conversion. No moderating water stream was introduced. The temperature in the regenerator 16 was controlled by the amount of heat removal in the catalyst cooler 26. The partial pressure of water to which the catalyst was exposed was only a function of the composition of the coke in stream 14 which set the stoichiometry of the combustion reaction. The values of key parameters in this and the remaining examples are given in the following table, in which parenthetical numbers refer to the FIGURE:

|                                                      | EXAMPLE NO. |        |        |        |        |
| ---------------------------------------------------- | ----------- | ------ | ------ | ------ | ------ |
| Parameter/Value                                      | 1           | 2      | 3      | 4      | 5      |
| Feed Rate to Regenerator (14), kg/hr                 |             |        |        |        |        |
| Catalyst                                             | 11,483      | 11,483 | 11,483 | 17,143 | 11,483 |
| Coke                                                 | 604         | 604    | 604    | 906    | 604    |
| Regenerator Temperature (16), ° C.                   | 649         | 649    | 649    | 649    | 760    |
| Catalyst Cooler Outlet Temperature (34) & (32), ° C. | 424         | 424    | 649    | 424    | 424    |
| Water Feed Rate (40), kg/hr                          | 0           | 2641   | 4390   | 2641   | 635    |
| Rate (38), kg/hr @ 38° C.                            | 0           | 0      | 0      | 0      | 4,536  |
| Catalyst Cooler Duty (26), GJ/hr                     | 17.3        | 8.7    | 0      | 17.3   | 10.0   |
| Rate (16), kg/hr                                     | 56,535      | 22,523 | 0      | 50,794 | 27,947 |
| Partial Pressure H$_2$O on Regenerator (16) at top, kPa | 11.7     | 88.9   | 116.5  | 69.2   | 20.5   |

EXAMPLE II

The system was operated as in Example I, except that sufficient moderating water was used to reduce catalyst cooler duty. 2641 lb/hr of a moderating water stream 40 was introduced to the regenerator 16 as a mixed air/water stream 42. The moderating water maintained the temperature in the regenerator 16 while requiring only one-half of the duty conventionally required by the catalyst cooler 26 and only about 40% of the rate of the catalyst stream 34. The partial pressure of water in the regenerator 16 also was significantly increased, as seen in Table 1.

EXAMPLE III

The system was operated as in Example I, except that sufficient moderating water was used to eliminate the catalyst cooler. 4390 lb/hr of moderating water stream 40 was introduced to the regenerator 16, and the temperature of the catalyst return stream 32 to the conversion reactor 12 was raised to the same temperature as that in the regenerator 16. Using this scheme, the desired temperature in the regenerator 16 was maintained with no duty on the catalyst cooler 26, and with a zero flow rate of catalyst in the stream 34. In other words, the need for a catalyst cooler 26 was eliminated.

EXAMPLE IV

The system was operated as in Example 1, except that sufficient moderating water was used to prevent exceeding the catalyst cooler duty limits when the rate of production of coke by the conversion reactor 12 was increased by 50%. In the absence of moderating water 40, an 50% production increase by the conversion reactor 12 would require a 50% increase in the duty of the catalyst cooler to maintain the desired temperature in the regenerator (16). However, by introducing 2641 lb/hr of moderating water stream 40 into the regenerator 16, the temperature in the regenerator 16 was maintained with the identical duty on the catalyst cooler 26 as that required in Example 1.

EXAMPLE V

The system was operated as in Example 1, except that sufficient moderating water was used to control partial pressure of steam in the regenerator. The temperature in the regenerator was maintained at about 760° C. 4536 lb/hr of fresh catalyst 44 was intermittently introduced to the regenerator. In order to improve the selectivity of the fresh catalyst 44, the partial pressure of steam to which the fresh catalyst stream 44 was subjected in the regenerator 16 was maintained above 13.79 kPa (2 psia). This was achieved by introducing 469 lb/hr of the moderating water stream 40, which resulted in a partial pressure of steam of 20.69 kPa (3 psia). The 469 lb/hr of moderating water further contributed to a reduction in duty of the catalyst cooler 26 of 0.7 Mbtu/hr, the balance of the reduction in duty of the catalyst cooler 26 relative to Example 1 coming from a combination of the increase in the desired temperature of the regenerator 16 and the introduction of the cold stream of fresh catalyst 44.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim:

1. A method for regenerating an oxygenate to olefins, molecular sieve-containing catalyst, comprising:
    providing an oxygenate to olefins, molecular sieve-containing catalyst having carbonaceous material deposited thereon; and
    contacting the catalyst in a regeneration zone with a stream comprising oxygen and water under hydrothermal conditions effective to remove the carbonaceous material from the catalyst, wherein the water forms steam within the regeneration zone at a partial pressure of at least 2 psia and the regeneration zone is above 700° C.; and
    introducing fresh catalyst into the regenerator, thereby contacting the fresh catalyst with steam.
2. The method of claim 1, wherein the contacted catalyst is withdrawn from the regeneration zone having about 0.5 wt % or less of the carbonaceous material.
3. The method of claims 1, further comprising contacting the fresh catalyst with air prior to introducing the fresh catalyst into the regenerator.
4. The method of claim 1, further comprising withdrawing a portion of the catalyst from the regeneration zone, cooling the withdrawn catalyst, and returning the cooled catalyst to the regeneration zone.

* * * * *